(12) United States Patent
Nishimura

(10) Patent No.: US 12,134,156 B2
(45) Date of Patent: Nov. 5, 2024

(54) MACHINE TOOL SYSTEM

(71) Applicant: FANUC CORPORATION, Yamanashi (JP)

(72) Inventor: Takuma Nishimura, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 45 days.

(21) Appl. No.: 17/999,033

(22) PCT Filed: May 25, 2021

(86) PCT No.: PCT/JP2021/019749
§ 371 (c)(1),
(2) Date: Nov. 16, 2022

(87) PCT Pub. No.: WO2021/241556
PCT Pub. Date: Dec. 2, 2021

(65) Prior Publication Data
US 2023/0219184 A1    Jul. 13, 2023

(30) Foreign Application Priority Data
May 29, 2020    (JP) .................................. 2020-094120

(51) Int. Cl.
*B23Q 11/12*    (2006.01)
*F16N 29/02*    (2006.01)

(52) U.S. Cl.
CPC .......... *B23Q 11/125* (2013.01); *B23Q 11/124* (2013.01); *F16N 29/02* (2013.01)

(58) Field of Classification Search
CPC ...... B23Q 11/124; B23Q 11/125; F16N 29/02
See application file for complete search history.

(56) References Cited

U.S. PATENT DOCUMENTS

| 10,695,881 | B1* | 6/2020 | He .................... B23Q 11/124 |
| 10,940,572 | B2* | 3/2021 | Hwang ................ F16N 29/02 |
| 11,559,866 | B2* | 1/2023 | Boelkins ............ B23Q 11/1046 |

(Continued)

FOREIGN PATENT DOCUMENTS

| JP | H07-040184 A | 2/1995 |
| JP | 2001-334442 A | 12/2001 |

(Continued)

OTHER PUBLICATIONS

International Search Report issued in PCT/JP2021/019749; mailed Jul. 27, 2021.

*Primary Examiner* — Michael A Riegelman
(74) *Attorney, Agent, or Firm* — Studebaker & Brackett PC

(57) ABSTRACT

Provided is a machine tool system that can supply an appropriate amount of lubricating oil to a machine tool according to the operation thereof. The machine tool system comprises: a lubricating oil supply unit that supplies a lubricating oil to a feed shaft of a machine tool; a code analysis unit that analyzes a machining program and determines whether a specific reciprocating operation is to be carried out at the feed shaft; and a control unit which, if it has been determined that the specific reciprocating operation is to be carried out, changes the supply of the lubricating oil via the lubricating oil supply unit to an exclusive pattern when the machine tool carries out the specific reciprocating operation.

5 Claims, 4 Drawing Sheets

(56) References Cited

U.S. PATENT DOCUMENTS

| | | | |
|---|---|---|---|
| 2009/0248188 A1* | 10/2009 | Haas | B23Q 11/123 |
| | | | 184/7.4 |
| 2019/0275628 A1* | 9/2019 | Hwang | B23Q 17/00 |
| 2020/0368866 A1* | 11/2020 | Tooyama | G05B 19/18 |
| 2023/0219184 A1* | 7/2023 | Nishimura | F16N 29/02 |
| | | | 184/6.14 |

FOREIGN PATENT DOCUMENTS

| | | |
|---|---|---|
| JP | 2009-101449 A | 5/2009 |
| JP | 2019-136780 A | 8/2019 |

\* cited by examiner

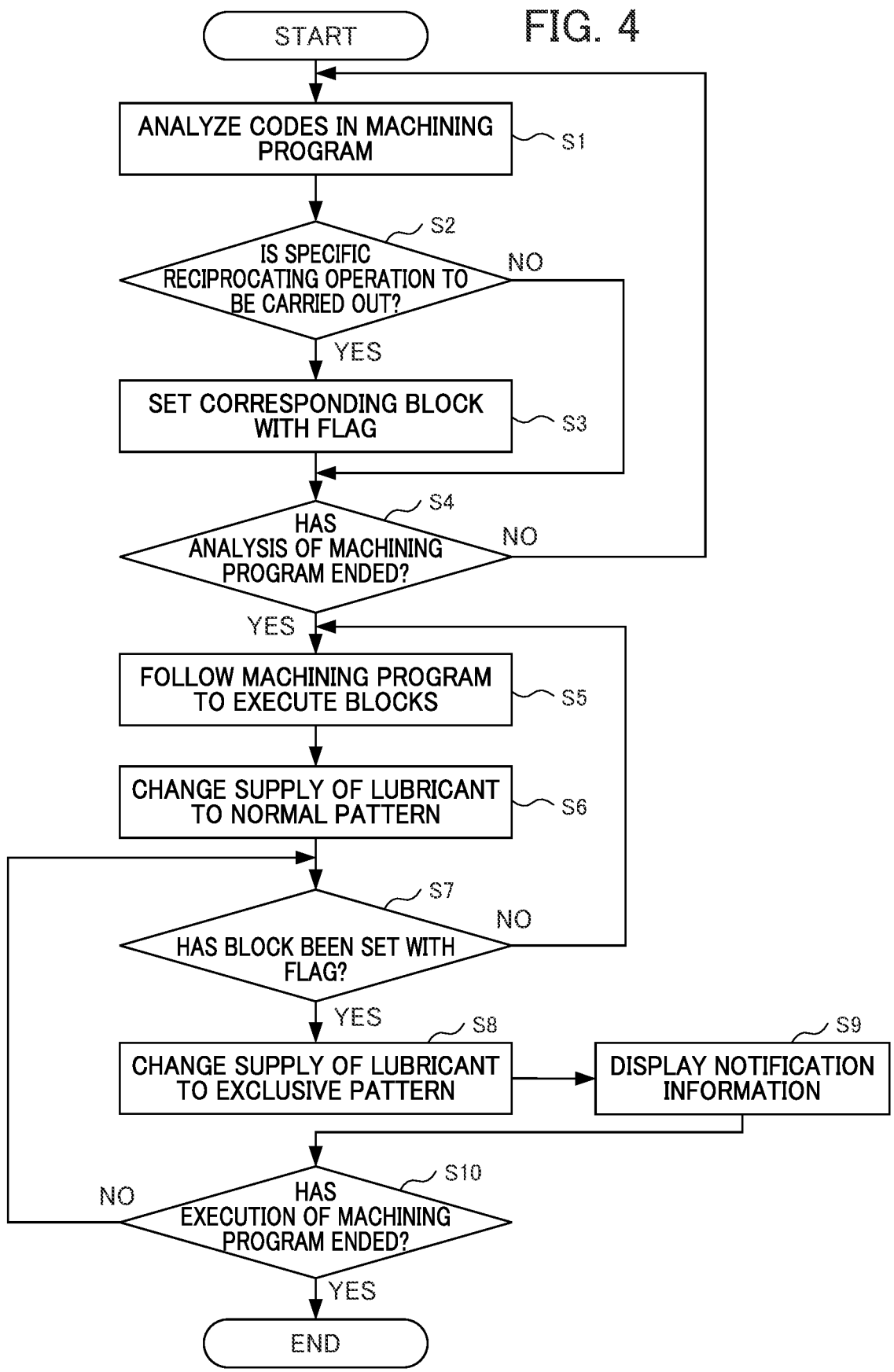

MACHINE TOOL SYSTEM

TECHNICAL FIELD

The present invention relates to a machine tool system.

BACKGROUND ART

Conventionally, a machine tool using a ball screw and a linear guide for a feed shaft includes a lubricating device configured to supply a lubricant to the ball screw and the linear guide. When the machine tool is in operation, the lubricating device operates at constant time intervals (for example, see Patent Document 1). With the method described in Patent Document 1, when the machine tool is in operation, the time while a table is moving in a reciprocating manner on a guide face of a supporting body s accumulated, and, in a case in which the accumulated time has reached time T0, a lubricant is supplied to the guide face within a constant time t0 at a constant amount V0.

Patent Document 1: Japanese Unexamined Patent Application, Publication No. 2001-334442

DISCLOSURE OF THE INVENTION

Problems to be Solved by the Invention

In the machine tool described above, if an interval of discharge of the lubricant is excessively long, the lubricant may become insufficient, leading to wear on the ball screw. On the other hand, if the interval of discharge of the lubricant is excessively short, an amount of consumption of the lubricant may increase. In particular, in a case in which an oscillating operation is carried out on the ball screw, there is intense contact of the contact points of the balls. As such, there may be difficulties in forming an oil film by the lubricant, leading to fretting, which easily causes the ball screw to wear. In a case in which the ball screw has worn, there may be some problems including lowered machining precision in the machine tool, for example. However, simply extending an interval of discharge of the lubricant may lead to another problem of an increase in amount of consumption of the lubricant. In view of such problems, what is demanded is to supply an appropriate amount of lubricant to a machine tool in accordance with its operation.

Means for Solving the Problems

A machine tool system according to the present disclosure includes: a lubricant supply unit configured to supply a lubricant to a feed shaft of a machine tool; a code analysis unit configured to analyze a machining program and to determine whether a specific reciprocating operation is to be carried out at the feed shaft; and a control unit configured to change, in a case in which it has been determined that the specific reciprocating operation is to be carried out, supply of the lubricant via the lubricant supply unit to an exclusive pattern in a case in which the machine tool carries out the specific reciprocating operation.

Effects of the Invention

According to the present invention, it is possible to supply an appropriate amount of lubricant to a machine tool in accordance with its operation.

BRIEF DESCRIPTION OF THE DRAWINGS

FIG. 4 is a flowchart illustrating processing of the machine tool system.

PREFERRED MODE FOR CARRYING OUT THE INVENTION

Figure 1:
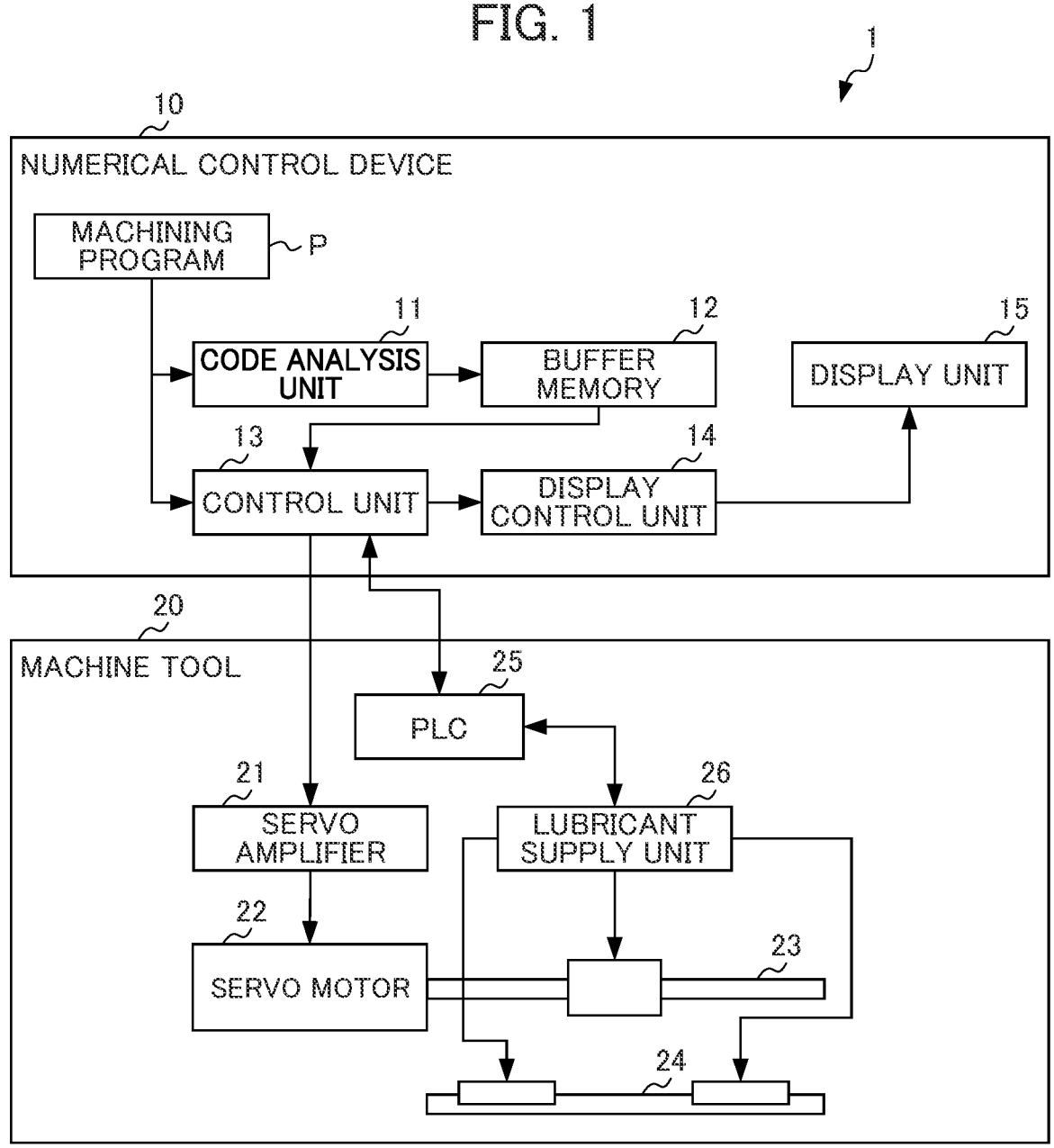
FIG. 1 is a view illustrating an outline of a machine tool system according to an embodiment.

An example of an embodiment of the present invention will now be described herein. FIG. 1 is a view illustrating an outline of a machine tool system 1 according to the present embodiment. The machine tool system 1 includes a numerical control device 10 and a machine tool 20. The numerical control device 10 is a device configured to control the machine tool 20 to cause the machine tool 20 to carry out predetermined machine processing and other processing.

The numerical control device 10 includes a code analysis unit 11, a buffer memory 12, a control unit 13, a display control unit 14, and a display unit 15. The machine tool 20 is a device configured to carry out predetermined machine processing such as cutting processing based on control by the numerical control device 10.

The machine tool 20 includes a servo amplifier 21, a servo motor 22, a ball screw 23, a linear guide. 24, a programmable logic controller (PLC) 25, and a lubricant supply unit 26.

The code analysis unit 11 is configured to analyze codes in a machining program P and to determine whether a specific reciprocating operation is to be carried out at the ball screw 23 and the linear guide 24 serving as a feed shaft. The buffer memory 12 is constructed from a volatile memory, for example, and is configured to store data provided from the code analysis unit 11 and to send the data to the control unit 13 at appropriate timings.

The control unit 13 is configured to control, based on the machining program P, supply of a lubricant via the lubricant supply unit 26. Specifically, in a case in which the code analysis unit 11 has determined that the specific reciprocating operation is to be carried out, the control unit 13 changes supply of the lubricant via the lubricant supply unit 26 to a predetermined or exclusive pattern in a case in which the machine tool 20 carries out a specific reciprocating operation. Note that details on control by the control unit 13 will be described later.

The display control unit 14 is configured to follow control by the control unit 13 to cause the display unit 15 to display predetermined information. Specifically, in a case in which the machine tool 20 carries out the specific reciprocating operation, the display control unit 14 causes the display unit 15 to display notification information indicating that the specific reciprocating operation is being executed.

The display unit. 15 is constructed from a liquid crystal display, for example, and is configured to follow control by the display control unit 14 to display the predetermined information. The servo amplifier 21 is configured to receive a control signal from the control unit 13 to control driving of the servo motor 22.

The servo motor 22 is configured to be driven in accordance with control by the servo motor 22. As the servo motor 22 rotates, the ball screw 23 is driven. The ball screw 23 is configured to be driven as the servo motor 22 rotates. Furthermore, the ball screw 23 is supplied with the lubricant from the lubricant supply unit 26.

The lineal guide 24 is configured to be operated as the ball screw 23 is driven. Furthermore, the linear guide 24 is supplied with the lubricant from the lubricant supply unit 26.

The PLC 25 is configured to receive a function signal, via a bus (not shown), from the control unit 13. Then, the PLC 25 uses a sequence program to process these signals and to output the processed output signals to the machine tool 20.

The lubricant supply unit 26 is configured to follow control based on the output signals outputted from the PLC 25 and to supply the lubricant to the ball screw 23 and the linear guide 24 serving as the feed shaft of the machine tool 20.

Figure 2:
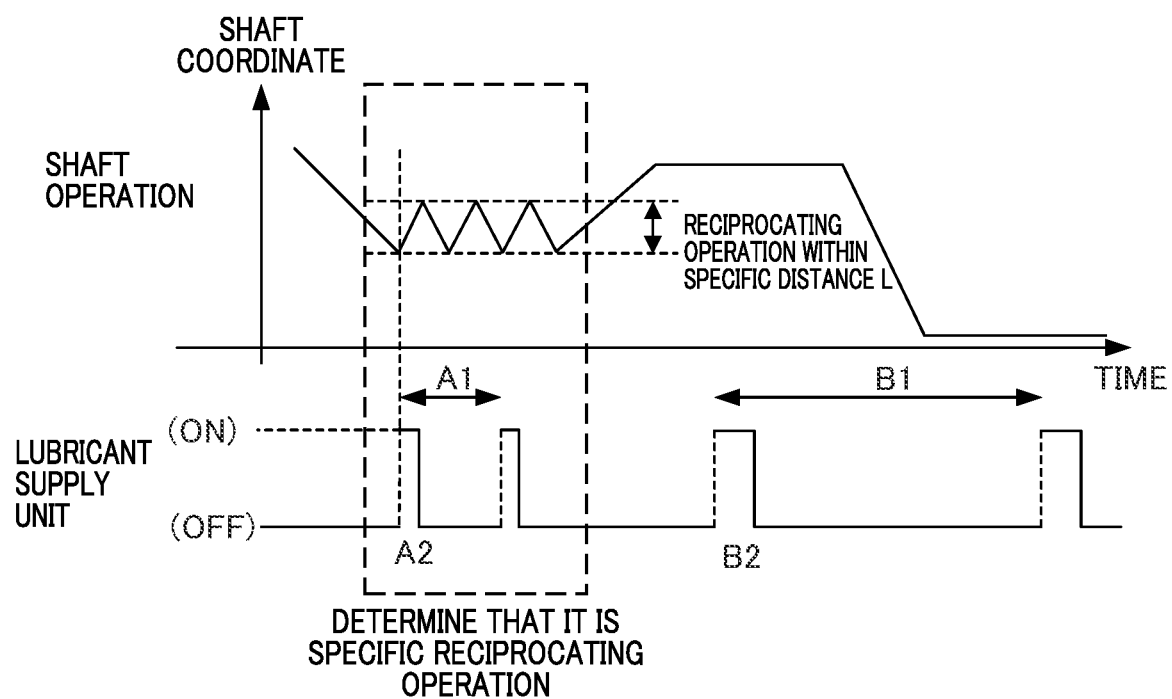
FIG. 2 is a view explaining operation of a lubricant supply unit.

FIG. 2 is a view explaining operation of the lubricant supply unit 26. In FIG. 2, the exclusive pattern includes an interval of discharge A1 and a period of time of discharge A2 during the specific reciprocating operation, while a normal pattern includes an interval of discharge B1 and a period of time of discharge B2 during the normal operation described above.

The interval of discharge A1 indicates an interval of discharge of the lubricant during the specific reciprocating operation by the ball screw 23, while the period of time of discharge A2 indicates a period of time of discharge of the lubricant during the specific reciprocating operation by the ball screw 23. Furthermore, the interval of discharge B1 indicates an interval of discharge of the lubricant during the normal operation by the ball screw 23, while the period of time of discharge B2 indicates a period of time of discharge of the lubricant during the normal operation by the ball screw 23.

As illustrated in FIG. 2, the interval of discharge A1 during the specific reciprocating operation is shorter than the interval of discharge B1 during the normal operation. Furthermore, the period of time of discharge A2 during the specific reciprocating operation is shorter than the period of time of discharge B2 during the normal operation.

Note herein that the specific reciprocating operation refers to, for example, a reciprocating operation to be carried out across a distance within a lead width of the ball screw 23. Note that the lead width of the ball screw 23 indicates a distance across which the ball screw 23 advances in an axial direction as the balls in the ball screw 23 each rotate once.

In a case in which the specific reciprocating operation described above is carried out, the ball screw 23 and the linear guide 24 are more prone to wear than during the normal operation due to the intensive contact points of the balls. As such, in a case in which the lubricant is supplied, similarly to that during the normal operation, there may be difficulties in forming an oil film by the lubricant, leading to fretting, which easily causes the ball screw to wear. Furthermore, simply extending an interval of discharge of the lubricant may lead to another problem of an increase in amount of consumption of the lubricant. In view of these problems, the machine tool system 1 according to the present embodiment changes, in a case in which the specific reciprocating operation is to be carried out, supply of the lubricant to the exclusive pattern to supply an appropriate amount of the lubricant.

Figure 3:
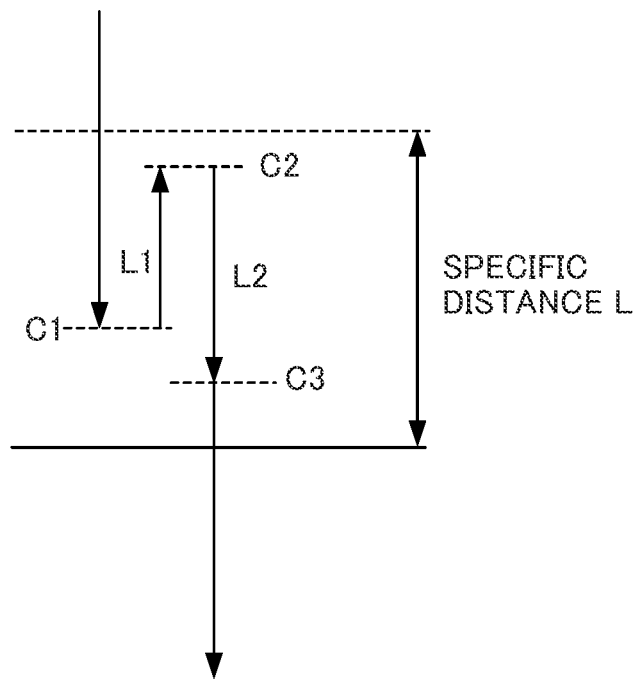
FIG. 3 is a view explaining a specific reciprocating operation of a ball screw.

FIG. 3 is a view explaining the specific reciprocating operation of the ball screw 23. As illustrated in FIG. 3, a distance of movement of the ball screw 23 from a flipping position C1 for the first time to a flipping position C2 for the second time is referred to as a distance of movement L1, while a distance of movement from the flipping position C2 for the second time to a next command position C3 is referred to as a distance of movement 12. Furthermore, a specific distance L indicates the lead width of the ball screw 23.

Then, in a case in which the distance of movement L1 and the distance of movement 12 both fall within the specific distance L in the machining program F, the code analysis unit 11 determines that the specific reciprocating operation is to be carried out at the ball screw 23.

If the code analysis unit 11 has determined that the specific reciprocating operation is to be carried out, the control unit 13 changes supply of the lubricant via the lubricant supply unit 26 to the exclusive pattern in a case in which the machine tool 20 carries out the specific reciprocating shaft operation.

Furthermore, in a case in which the code analysis unit 11 does not determine that the specific reciprocating operation is to be carried out, the control unit 13 causes the lubricant supply unit 26 to supply the lubricant in accordance with the normal pattern.

FIG. 4 is a flowchart illustrating processing of the machine tool system 1. At Step S1, the code analysis unit 11 analyzes the codes in the machining program P. At Step S2, the code analysis unit 11 determine s whether the specific reciprocating operation is to be carried out at the ball screw 23. In a case in which it is determined that the specific reciprocating operation is to be carried out (YES), the processing proceeds to Step S3. On the other hand, in a case in which it is determined that the specific reciprocating operation is not to be carried out. (NO), the processing proceeds to Step S4.

At Step S3, the code analysis unit 11 sets a block with a flag, at which it has been determined that the specific reciprocating operation is to be carried out, in the machining program P. At Step S4, the code analysis unit 11 determines whether analysis of the whole machining program P has ended. In a case in which analysis of the whole machining program P has ended (YES), the processing proceeds to Step S5 On the other hand, in a case in which analysis of the whole machining program P has not yet ended (NO), the processing returns to Step S1.

At Step S5, the control unit 13 follows the machining program. P to execute the blocks constituting the machining program P. Thereby, the ball screw 23 and the linear guide 24 operate in accordance with control by the control unit 13.

At Step S6, the control unit 13 changes supply of the lubricant via the lubricant supply unit 26 to the normal pattern. Furthermore, in a case which the normal pattern has already been set, the control unit 13 maintains the normal pattern. Thereby, the lubricant supply unit 26 follows the normal pattern to supply the lubricant to the ball screw 23 and the linear guide 24.

At Step S7, the control unit. 13 determines whether the block being executed is set with the flag. In a case in which the flag has been set (YES), the processing proceeds to Step S8. On the other hand, in a case in which the flag has not yet been set (NO), the processing returns to Step S5.

At Step S8, the control unit 1:3 changes supply of the lubricant via the lubricant supply unit 26 to the exclusive pattern. At Step 39, the display control unit 14 causes the display unit 15 to display notification information (for example, message) indicating that the specific reciprocating operation is being executed.

At Step S10, the control unit 13 determines whether execution of the machining program P has ended. In a case in which execution of the machining program P has ended (YES), then the processing ends. On the other hand, in a case in which execution of the machining program P has not yet ended (NO), the processing returns to Step S7.

As described above, according to the present embodiment, the machine tool system 1 includes: the lubricant supply unit. 26 configured to supply the lubricant to the ball screw 23 and the linear guide 24 of the machine tool 20; the code analysis unit 11 configured to analyze the machining program P and to determine whether the specific reciprocating operation is to be carried out at the ball screw 23 and the linear guide 24; and the control unit 13 configured to change, in a case in which it has been determined that the specific reciprocating operation is to be carried out, supply of the lubricant via the lubricant supply unit 26 to the exclusive pattern in a case in which the machine tool 20 carries out the specific reciprocating operation.

Thereby, the machine tool system 1 analyzes the machining program prior to operation of the ball screw 23 and the linear guide 24 and supplies the lubricant in accordance with the exclusive pattern simultaneously when the specific reciprocating operation starts. Therefore, the machine tool system 1 is able to supply an appropriate amount of the lubricant to the machine tool 20 in accordance with its operation even in a case in which the specific reciprocating operation is to be carried out.

Furthermore, in a case in which it has been determined that the specific reciprocating operation is not to be carried out, the control unit 13 changes supply of the lubricant via the lubricant supply unit 26 to the normal pattern in a case in which the machine tool 20 carries out the normal operation Thereby, the machine tool system 1 is able to supply an appropriate amount of the lubricant to the machine tool 20 in accordance with its operation even in a case in which the specific reciprocating operation is not to be carried out.

Furthermore, the normal pattern and the exclusive pattern each include an interval of discharge and a period of time of discharge of the lubricant, and the interval of discharge and the period of time of discharge during the exclusive pattern are respectively shorter than the interval of discharge and the period of time of discharge during the normal pattern. Thereby, the machine tool system 1 is able to supply appropriate amounts of lubricant respectively in both the normal operation and the specific reciprocating operation.

Furthermore, the feed shaft includes the ball screw 23, and the specific reciprocating operation includes the reciprocating operation to be carried out across a distance within the lead width of the ball screw 23. Thereby, the machine tool system 1 is able to supply, an appropriate amount of the lubricant to the ball screw 23 in accordance with the specific reciprocating operation.

Furthermore, the machine tool system 1 further includes the display control unit 14 configured to cause, in a case in which the machine tool 20 carries out the specific reciprocating operation, the display unit 15 to display notification information indicating that the specific reciprocating operation is being executed. Thereby, the machine tool system 1 is able to appropriately notify, to an operator using the machine tool 20, for example, that the specific reciprocating operation is to be carried out.

Although the embodiment of the present invention has been described above, it is possible to achieve the machine tool system 1 described above through hardware, software, or combination thereof. Furthermore, it is possible to achieve a control method that is to be implemented by the machine tool system 1 described above through hardware, software, or combination thereof. Herein, achievement through software means achievement when a computer reads and executes a program.

It is possible to use a non-transitory computer readable medium that varies in type to store the program, and to supply the program to a computer. Examples of the non-transitory computer readable medium include tangible storage media that vary in type. Examples of the non-transitory computer readable medium include magnetic recording media (for example, hard disk drive), magneto-optical recording media (for example, magneto-optical disc), compact disc read only memories (CD-ROM), compact disc-recordable (CD-R), compact disc-rewritable (CD-R/W), semiconductor memories (for example, mask ROM, programmable ROM (PROM), erasable PROM (EPROM), flash ROM, and random access memory (RAM)).

Furthermore, although the foregoing embodiment represents a preferable embodiment of the present invention, the scope of the present invention should not be limited to only the embodiment described above. The present invention can be implemented in various modified forms to the extent that such forms do not depart from the gist of the present invention.

EXPLANATION OF REFERENCE NUMERALS

1 Machine tool system
10 Numerical control device
20 Machine tool
11 Code analysis unit
12 Buffer memory
13 Control unit
14 Display control unit
15 Display unit
21 Servo amplifier
22 Servo motor
23 Ball screw
24 Linear guide
25 PLC
26 Lubricant supply unit

The invention claimed is:

1. A machine tool system comprising:
a lubricant supply unit configured to supply a lubricant to a feed shaft of a machine tool;
a code analysis unit configured to analyze a machining program and to determine whether a specific reciprocating operation is to be carried out at the feed shaft; and
a control unit configured to change, in a case in which it has been determined that the specific reciprocating operation is to be carried out, supply of the lubricant via the lubricant supply unit to an exclusive pattern in a case in which the machine tool carries out the specific reciprocating operation, wherein
the specific reciprocating operation is an operation in which a ball screw reciprocally moves on the feed shaft.

2. The machine tool system according to claim 1, wherein the control unit changes, in a case in which it has been determined that the specific reciprocating operation is not to be carried out, supply of the lubricant via the lubricant supply unit to a normal pattern in a case in which the machine tool carries out a normal operation.

3. The machine tool system according to claim 2, wherein
the normal pattern and the exclusive pattern each include an interval of discharge and a period of time of discharge of the lubricant, and
the interval of discharge and the period of time of discharge in the exclusive pattern are respectively shorter than the interval of discharge and the period of time of discharge in the normal pattern.

4. The machine tool system according to claim 1, wherein the specific reciprocating operation includes a reciprocating operation to be carried out across a distance within a lead width of the ball screw.

5. The machine tool system according to claim 1, further comprising a display control unit configured to cause, in a case in which the machine tool carries out the specific reciprocating operation, a display unit to display notification information indicating that the specific reciprocating operation is being executed.

* * * * *